March 17, 1953  C. E. JOHNSON ET AL  2,631,462
POWER TRANSMISSION
Filed Sept. 13, 1948  3 Sheets-Sheet 1
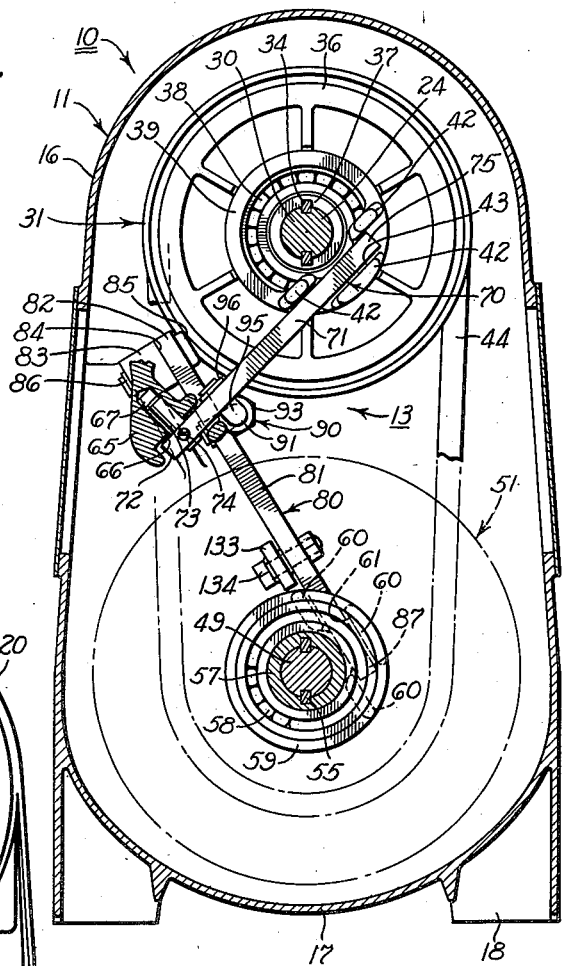
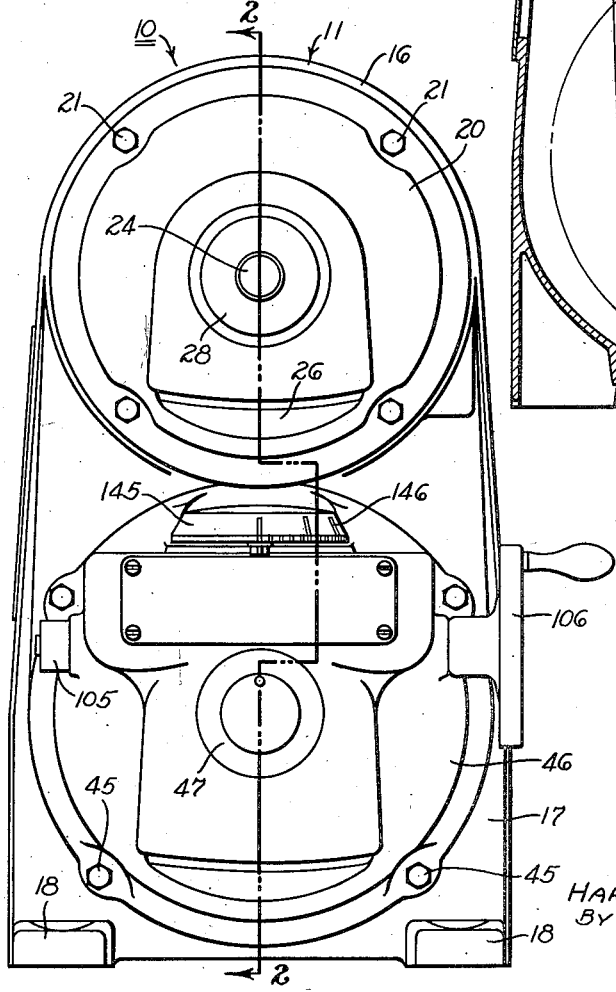
INVENTORS.
CARL E. JOHNSON
EARL MENDENHALL
BY THEIR ATTORNEYS.
HARRIS, KIECH, FOSTER & HARRIS March 17, 1953 C. E. JOHNSON ET AL 2,631,462
POWER TRANSMISSION
Filed Sept. 13, 1948 3 Sheets-Sheet 2
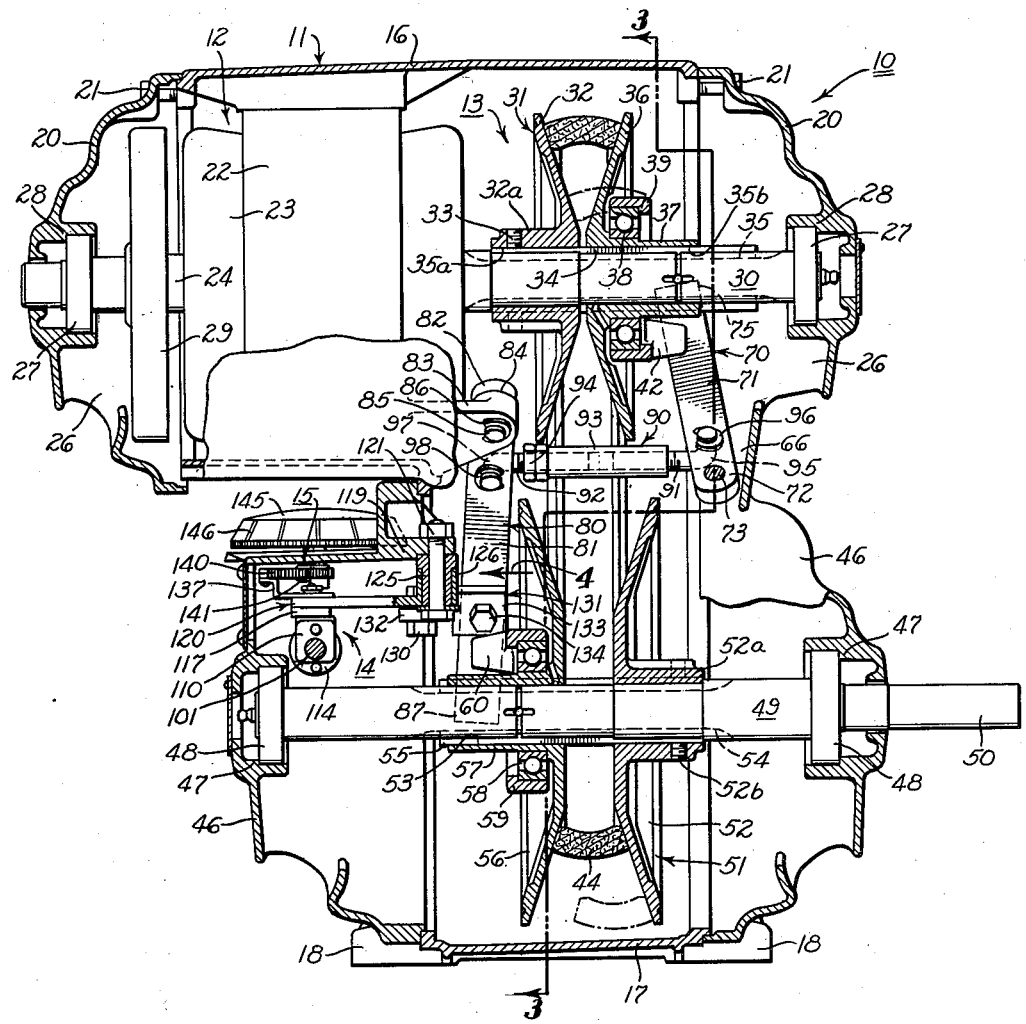
Fig. 2.
INVENTORS.
CARL E. JOHNSON
EARL MENDENHALL
BY THEIR ATTORNEYS.
HARRIS, KIECH, FOSTER & HARRIS
BY

INVENTORS.
CARL E. JOHNSON
EARL MENDENHALL
BY THEIR ATTORNEYS.
HARRIS, KIECH, FOSTER & HARRIS
BY

Patented Mar. 17, 1953

2,631,462

UNITED STATES PATENT OFFICE 2,631,462

POWER TRANSMISSION

Carl E. Johnson and Earl Mendenhall, San Marino, Calif., assignors to Sterling Electric Motors, Inc., Los Angeles, Calif., a corporation of California Application September 13, 1948, Serial No. 49,034

11 Claims. (Cl. 74—230.17)

This invention relates to variable speed power transmissions and more particularly to variable speed power transmissions of the type incorporating one or more V-type pulleys having variable diameters and attaining such diametrical variability from the cooperation of a fixed, frusto-conical flange utilized in conjunction with an axially shiftable, frusto-conical flange.

The utilization of V-type pulleys having variable diameters and consisting of an axially shiftable frusto-conical flange utilized in conjunction with a fixed, frusto-conical flange is an old expedient but the major difficulties which arise from the use of such variable diameter pulleys in speed reducing assemblies spring from the difficulty inherent in providing adequate linkage and control means adapted to control the accurate displacement of the axially shiftable flange of such a pulley in relation to the fixed flange thereof. Although it is customary to utilize such variable diameter pulleys in cooperating pairs in speed changer units and we, therefore, describe our invention as used in conjunction with a pair of such pulleys, it is conceivable that the basic concept of our invention might be utilized in conjunction with a speed changer assembly consisting of a conventional V-type pulley associated with a V-type pulley having a varying diameter.

Fundamentally, our invention resides in the provision of linkage means adapted to permit the simultaneous and proportional control of the axial displacement of the movable flange of a drive pulley in conjunction with and in proportion to the axial displacement of the movable flange of a driven pulley associated therewith through the medium of a conventional V-belt.

Although the basic concept of providing a pair of such variable diameter pulleys is not new, the variable speed control linkage provided by our invention permits the utilization of such pulley combinations in applications where it has been previously infeasible to incorporate them.

One of the major difficulties encountered in prior art speed control linkages for the control of the movement of the axially shiftable flanges of variable diameter V-type pulleys has been the fact that such linkages occupied a comparatively large area and the incorporation thereof in conjunction with a power source within a housing necessitated the provision of a housing of considerable proportions. Since speed changing apparatus of this type is frequently incorporated in and associated with machines which provide a minimal amount of room for such apparatus, the use of speed changers of the conventional type embodied in relatively large housings was impractical.

It is, therefore, a primary object of our invention to provide a variable speed changer which incorporates a pair of variable diameter V-type pulleys which are utilized in conjunction with and which are adapted to be controlled by a linkage which occupies a much smaller space than has hitherto been necessary for conventional linkages adapted to control such pulleys. Thus, the size of housing incorporating such speed reducing assemblies can be materially reduced and the range of application of such speed reducers greatly enlarged.

Previous control linkages have utilized a plurality of widely spaced levers adapted to simultaneously control the movement of the axially shiftable flanges of the pulleys and have also incorporated space consuming screw, or similar, means adapted to activate the levers to move the axially shiftable flanges. Such prior art control levers are usually disposed on either side of the pulleys to be controlled and are usually arranged with their longitudinal axes normal to the axis of rotation of the controlled pulley. Also found in the prior art are chain and sprocket control arrangements whereby the rotation of a sprocket incorporated upon a screw means embodied in the variable diameter pulley will cause the axial shifting of the movable flange therearound. All of these arrangements for controlling such pulleys necessitate the utilization of relatively large sized housings to permit their incorporation therein.

It is another object of our invention to provide a control linkage for a variable speed transmission apparatus which utilizes a first control lever and a second control lever pivotally mounted within the housing in which they are embodied and having free ends adapted to contact the axially shiftable flanges of the pulleys with which they are associated, said free ends being spaced a distance substantially equal to that lying between the axis of rotation of the pulleys with which they are associated. In other words, only little more space is consumed by the control linkage than is necessary to house the pulley combination itself and the exterior dimensions of the housing in which the variable speed apparatus is embodied may be materially reduced.

Another object of our invention is the provision of a control linkage for a variable speed changer which is adapted to positively control the proportional change in the diameters of the associated pulleys in the apparatus.

A further object of our invention is the provision of a control linkage for a speed changing apparatus adapted to be associated with an electric motor which has incorporated therein adjusting means designed to permit the minimal and maximal limits to which the diameters of the pulleys may be varied to be simultaneously adjusted.

An additional object of our invention is the provision of a control linkage adapted to be utilized in a speed changing system which has associated therewith visual indicating means designed to indicate the speed ratio at which the control linkage has positioned the associated pulleys incorporated in the apparatus.

Another object of our invention is the provision of a speed changing apparatus including control linkage therefor which is provided with actuating means for said control linkage having incorporated therein means adapted to limit the maximal and minimal extent to which the speed changing linkage can be adjusted.

A further object of our invention is the provision of a control linkage for a variable speed control apparatus which is comprised of a minimum number of simple parts and which is of extremely durable construction.

Other objects and advantages of our invention will become apparent from a perusal of the following specification and the accompanying drawings, which are for the purpose of illustration only, and in which:

Fig. 1 is a side elevational view of the speed changing apparatus incorporating the principles of our invention;

Fig. 2 is an enlarged vertical sectional view taken on broken line 2—2 of Fig. 1;

Fig. 3 is a vertical sectional view taken on broken line 3—3 of Fig. 2;

Figure 4:
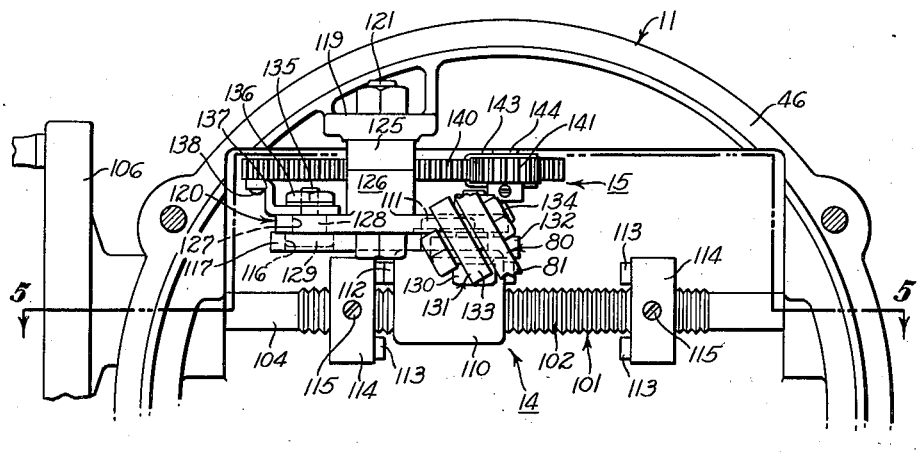
Fig. 4 is a fragmentary, enlarged view of the actuating and control means for the control linkage taken in the direction of the arrow 4 of Fig. 2.

Referring to the drawings, we show a variable speed power unit 10 which is incorporated in a substantially unitary housing 11 and which includes an electric motor 12 which constitutes the primary power source of the unit. Associated with the electric motor 12 and adapted to vary the speed of rotation of an object, not shown, driven by said motor 12 is a variable speed control linkage 13 which is adapted to be actuated and adjusted by actuating means indicated generally at 14.

Associated with the actuating and adjustment means 14 for the variable speed control linkage 13 is an indicating mechanism 15 which is adapted to indicate the amount of adjustment imparted to the variable speed control linkage 13 by the actuating and adjustment means 14.

The housing 11 of the variable speed power unit 10 may be generally divided into an upper portion 16 which shrouds the electric motor 12 and a lower portion 17 which incorporates the actuating and adjustment means 14 for the control linkage, it being understood that the variable speed control linkage 13 is housed in both portions of the housing 11 at one side thereof. The lower portion 17 of the housing 11 is provided with a plurality of feet 18 which are adapted to permit the housing 11 to be fixedly but removably mounted upon a surface with which it is associated.

The ends of the upper portion 16 of the housing 11 are constituted by two removable bells or end members 20 which are secured to the upper portion 16 by means of screws 21, or similar fasteners. The electric motor 12 is enclosed by the upper portion 16 of the housing 11 and consists generally of a stator 22 encompassing a rotor 23 which is mounted for rotation within the field of the stator upon a drive shaft 24.

Provided in the bells 20 secured to the upper portion 16 of the housing 11 are bearing housings 28 which receive thrust bearings 27 in which the opposite ends of the drive shaft 24 are rotatably mounted. Secured to the shaft 24 adjacent the rotor 23 and adapted to be rotated thereupon is a fan 29 which draws cooling air through apertures 26 provided in the bells 20 to cool the motor during its operation.

Mounted upon a drive portion 30 of the shaft 24 is a V-type drive pulley 31 which is capable of having its diameter varied by the action of the variable control linkage 13. The drive pulley 31 includes a fixed, frusto-conical flange 32. The hub 32a of the fixed, frusto-conical flange 32 is provided with internal, longitudinally directed keyways 35a which are adapted to receive portions of longitudinally extending keys 34 mounted within keyways 35 formed in the shaft 24. Thus, the fixed flange 32 of the pulley 31 is keyed against relative rotation in reference to the shaft 24. To prevent the axial shifting of the fixed flange 32 of the pulley 31 the hub 32a thereof is provided with a plurality of set screws 33 which impinge upon the keys 34 and prevent the lateral displacement of the fixed flange 32.

Associated and in operative relationship with the fixed flange 32 of the pulley 31 is a frusto-conical, axially shiftable flange 36 having an elongated, sleeve-like hub 37 in which are formed elongated keyways 35b adapted to receive the keys 34 suitably mounted within a keyway 35 provided in the shaft 24. The keys 34 and the cooperating keyways 35 and 35b prevent the rotation of the axially shiftable flange 36 in reference to the shaft 24 but, since the hub 37 is in no other way fixed to the periphery of the shaft 24, the flange 36 is capable of axial and lateral movement upon the shaft 24.

Mounted upon the elongated, sleeve-like hub 37 of the axially shiftable flange 36 is a thrust bearing 38 which is encompassed by a generally annular bearing housing or lug member 39. Since the bearing 38 is interposed between the hub 37 and the bearing housing 39, the bearing housing 39 may be restrained from rotation in respect to the hub 37 by suitable means to be described in greater detail below. Integrally formed upon the bearing housing 39 is a plurality of spaced lugs 42 which are disposed axially of the drive shaft 24 and which define between them a slot 43, the purpose of which will be described more fully below. Trained upon the V-groove defined by the cooperative relationship established between the fixed flange 32 and the axially shiftable flange 36 is a conventional V-belt 44 which is adapted to transmit the driving power of the drive shaft 24.

Suitably mounted upon the ends of the lower portion 17 of the housing 11, as by means of screws 45 or similar fasteners, are closure members or bells 46. Centrally located in the bells 46 are bearing housings 47 adapted to receive thrust bearings 48 in which is rotatably mounted a driven shaft 49 having its axis substantially parallel to the axis of the drive shaft 24. One end 50 of the driven shaft 49 protrudes from the bearing housing 47 and is adapted to have mounted thereupon any suitable power transmitting means, not shown, to permit the operation by the variable speed power unit 10 of any desired machine or apparatus, not shown.

Mounted upon the driven shaft 49 and adapted to be rotated thereby is a driven V-type pulley 51 which includes a fixed, frusto-conical flange 52 incorporating a hub portion 52a and provided with longitudinally extending keyways 53 formed upon the interior of said hub portion 52a. Suitably disposed within keyways 54 formed in the driven shaft 49 are longitudinally extending keys 55 which are adapted to retain the fixed flange 52 for rotation with the shaft 49. Set screws 52b are provided in the hub portion 52a of the fixed flange 52 and are adapted to impinge upon the keys 55 to prevent the lateral and axial displacement of the fixed flange 52.

Associated with the fixed flange 52 is an axially shiftable, frusto-conical flange 56 which includes an integral elongated hub 57 having internally disposed keyways 58 adapted to cooperate with the keys 55 mounted in the keyways 54 of the driven shaft 49. The keyed relationship of the axially shiftable flange 56 of the pulley 51 to the shaft 49 prevents the relative rotation of said flange in reference to the driven shaft 49 but since the flange 56 is in no other way affixed to the driven shaft 49, the axial shifting of the flange 56 thereupon is permitted. Mounted upon the hub portion 57 of the axially shiftable flange 56 is a thrust bearing 58 which is encompassed by a bearing housing or lug member 59. The bearing housing 59 is provided with a plurality of axially directed, spaced, integral lugs 60 which cooperatively define therebetween a slot 61.

Mounted within a boss 65 formed integrally with the interior of the housing 11 and adapted to be obliquely maintained therein in reference to the vertical axis of the housing 11 through the medium of an obliquely disposed guide slot 66 formed in said boss is a first control lever 70. The control lever 70 is of generally rectangular cross section and is constituted by an elongated rectangular rod 71, the lower end 72 of which is pivotally mounted upon a pivot pin 73 which is adapted to be received in a hole 67 formed in the boss 65 and which is securely maintained in operative relationship with the first control lever 70 through the medium of a set screw 74 threadedly engaged in the lower end 72 of the first control lever 70. The free upper end 75 of the first control lever 70 is adapted to be inserted in the slot 43 defined by the integral lugs 42 upon the bearing housing 39 and is intended to control the axial shifting of the movable flange 36 of the V-drive pulley 31.

Pivotally mounted upon an integral boss 83 formed in the interior of the housing 11 and directed obliquely downward by its contact with the obliquely disposed upper surface 84 of said boss is a second control lever 80 which is constituted by an elongated rod 81 of generally rectangular cross section. The second control lever 80 is maintained at its upper end 82 in pivotal suspension upon the boss 83 through the medium of a headed pin 85 which is retained in a hole formed in said boss through the medium of a snap ring 86 encompassing the end of said pin 85. The second control lever 80 is directed downwardly and obliquely in reference to the vertical axis of the housing 11 and its lower end 87 is adapted to be received in the slot 61 defined by the integral lugs 60 formed upon the bearing housing 59 associated with the movable flange 56 of the driven pulley 51.

As best shown in Figs. 2 and 3 of the drawings, the pivotally supported ends of the first and second control levers 70 and 80 intersect adjacent their points of pivotal mounting and diverge from their points of pivotal mounting to engage, respectively, the slots 43 and 61. When thus engaged in the slots 43 and 61 the free ends 75 and 87 of the control levers 70 and 80 are spaced apart by a distance which is substantially equal to the distance between the axes of rotation of the pulleys with which they are respectively associated. The manner in which the control levers 80 and 70 are obliquely disposed in reference to the vertical axis of the housing 11 permits the control linkage to be accommodated in a space much smaller than has hitherto been possible with prior art linkages and the accommodation of the speed changing mechanism in housings of smaller proportions than has hitherto been possible is thus readily accomplished.

In order to insure the proportional and simultaneous movement of the control levers 70 and 80, there is provided between the control levers 70 and 80 connecting means 90 which comprises a threaded adjusting screw 91 and an oppositely threaded adjusting screw 92 operatively combined by means of an adjusting sleeve 93. The provision of the oppositely threaded adjusting screws 91 and 92 in conjunction with the adjusting sleeve 93 permits the spatial relationship between the ends of the control levers 70 and 80 to be accurately adjusted and also determines the maximum limit between which the diameters of the pulleys may be varied. The provision of the connecting means 90 also serves to retain the free ends 75 and 87 of the control levers 70 and 80 in continuous contact with the slots 43 and 61 in which they are seated and thus prevents the dislodgement of the control levers from said slots. In order to prevent the inadvertent dislocation of the connecting means 90, a lock nut 94 associated with the adjusting sleeve 93 is provided which maintains the adjusting sleeve 93 in its predetermined position until voluntarily disturbed.

As best shown in Figs. 2 and 3 of the drawings, the connecting means 90 pivotally engages the first control lever 70 and the second control lever 80 intermediate the pivoted and free ends thereof and adjacent the points of pivotal suspension. The connecting means 90 is operatively and pivotally maintained in contact with the control levers 70 and 80. The end of the adjusting screw 91 is provided with a right angle portion 95 adapted to be received in a hole in the first control lever 70 and to be retained therein through the medium of a snap ring 96 encompassing the end of the right angle portion 95. In a similar manner, the adjusting screw 92 is provided with a right angle portion 97 which is operatively retained in a hole provided in the second control lever 80 and maintained therein by means of a snap ring 98 surrounding the end of said right angle portion.

Figure 5:
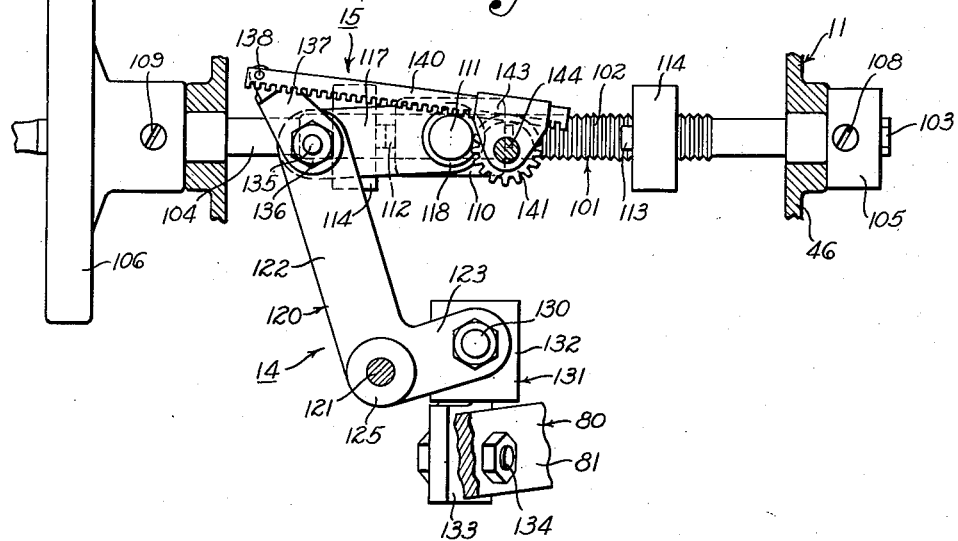
Fig. 5 is a fragmentary, partially sectional, partially plan view taken on broken line 5—5 of Fig. 4.

The actuating and adjusting mechanism 14 for the control linkage 13 comprises a generally cylindrical, elongated control rod 101 which is provided with an intermediate threaded portion 102 (Figs. 4 and 5) and which has one end 103 protruding from the rear of the bell 46 and the other end 104 protruding from the front of the bell 46. The control rod 101 has its end portion 103 provided with a thrust collar 105 which is secured to the end portion 103 by means of a screw 108, or a similar fastener, and which is adapted to prevent the longitudinal displacement of the control rod 101. Fixedly mounted upon the other end 104 of the control rod 101, as by means of a fastener 109, is a hand wheel 106 which is adapted, when rotated, to cause the concomitant rotation of the control rod 101.

Threadedly engaging the intermediate threaded portion 102 of the control rod 101 is a travelling nut 110 which has formed thereupon an upwardly directed integral boss 111 and which is provided with a dual stop pin 112 which has its longitudinal axis arranged parallel to the longitudinal axis of the control rod 101. Mounted upon opposite ends of the intermediate threaded portion 102 of the control rod 101 are stop blocks 114 provided with a plurality of stop pins 113 adapted to cooperate with the dual stop pin 112 of the travelling nut 110. The stop blocks 114 are fixedly maintained upon the threaded intermediate portion 102 by means of screws 115, or similar fasteners, and are adapted to limit the longitudinal movement of the travelling nut 110 upon the threaded intermediate portion 102 of the control rod 101 and thus determine the extent to which the control linkage 13 can be actuated. When the maximum travel of the travelling nut 110 in either direction upon the intermediate threaded portion 102 has been reached, one of the stop pins 113 is contacted by the dual stop pin 112 of the travelling nut 110 and the further travel of the nut 110 is prevented.

Pivotally suspended upon the upwardly directed, integral boss 111 of the travelling nut 110 is a link 117 which is secured upon the boss 111 through the medium of a snap ring 118 encircling the periphery of that portion of the boss which protrudes above the upper surface of the link 117. Secured to a bracket 119 formed integrally upon the upper part of the interior of the bell 46 through the medium of a bolt and nut combination 121 is a bell crank 120 which is provided with a central hub portion 126 lying between a driven arm 122 and a driving arm 123. Disposed within the hub 126 of the bell crank 120 and adapted to serve as a bearing therefor is a spacer sleeve 125 which encircles the shaft of the bolt 121.

Secured within an aperture 127 formed in the end of the driven arm 122 of the bell crank 120 is a stud 128 having a head 129. The link 117 is provided with an opening 116 which is adapted to engage the head 129 of the bell crank stud 128 and the movement of the travelling nut 110 upon the intermediate threaded portion 102 of the control rod 101 is thus transmitted through the link 117 to the end of the driven arm 122 of the bell crank 120 to cause the rotation of the bell crank 120 in an arcuate path upon the bolt-nut combination 121 below the integral bracket 119. The bell crank 120 thus constitutes the means by which the longitudinal motion of the travelling nut 110 upon the intermediate threaded portion 102 of the control rod 101 is adapted to be transferred to the control linkage constituted by the control levers 70 and 80 and their connecting means 90. To establish the operative relationship between the driving arm 123 of the bell crank 120, there is provided an offset link assembly 131 which is fastened to the end of the driving arm 123 of the bell crank 120 through the medium of a bolt and nut combination 130. The offset link assembly includes a plate 132 and a plate 133, one of said plates being obliquely disposed in reference to the other in order to facilitate the fastening of th oblique plate to the obliquely and downwardly directed control rod 80. In the present instance the plate 133 is shown as being obliquely disposed with reference to the horizontal plane of the bell crank and the plate 132 and is adapted to be secured to the second control lever 80 through the medium of a bolt and nut combination 134 which permits the pivotal movement of the lever 80 upon the surface of the plate 133.

Thus, when the travelling nut 110 is caused to be longitudinally displaced upon the intermediate threaded portion 102 of the control rod 101 because of the voluntary rotation of the associated hand wheel 106, the movement of the travelling nut 110 will be communicated to the end of the driven arm 122 of the bell crank 120 through the medium of the connecting link 117. The bell crank 120 will then rotate upon the bolt 121 causing the offset link assembly 131 to be carried upon the end of the driving arm 123 of the bell crank and, in turn, causing the lateral displacement of the second control lever 80.

Associated with the travelling nut 110 through the medium of the driven arm 122 of the bell crank 120 is an indicating mechanism 15 which includes a support arm 137 mounted upon a reduced screw portion 135 of the stud 128 by a nut or similar fastener 136. Pivotally secured at one end to the support arm 137 through the medium of a pin 138 or similar fastener is a rack gear 140 which engages a pinion 141 and is retained in engagement therewith through the medium of a rack carrier 143 which is supported upon a shaft 144 which also mounts the pinion 141.

Positioned externally of the housing and adapted for rotation on and by the pinion shaft 144 is a visual indicator 145 (Fig. 2) which bears upon its periphery indicia 146 adapted to indicate the speed at which the speed changer apparatus has been set. When the driven arm 122 of the bell crank 120 is moved by the travelling nut 110 the rack 140 is carried on the support arm 137 to rotate the pinion 141 and the indicator 145. Thus, the accurate indication of the speed at which the speed changer apparatus has been set is rendered feasible.

We thus provide by our invention a variable speed changer apparatus which is adapted to be incorporated in a much smaller housing than has hitherto been possible with apparatus of this type. This desirable feature is secured through the utilization of first and second control levers which are uniquely arranged with their ends pivotally suspended within the housing and intersecting each other adjacent the point of pivotal suspension. By this method of suspension and by intersecting the ends of the levers adjacent the points of pivotal suspension, the free ends of the levers need be spaced only so far apart as the distance lying between the axes of rotation of the diametrically expansible and contractible pulleys whose diameters are to be controlled by the free ends of the levers.

Also provided by our invention is a highly efficient and durable actuating and adjusting means whose motion is designed to be effectively communicated to one of the levers and transmitted to the other of the levers through the medium of adjustable connecting means which serves also to determine the maximal and minimal expansion and contraction permitted or to the variable diameter V-pulleys.

Although we have shown and described a preferred embodiment of our invention, it is obvious that certain portions and elements thereof may be replaced by other portions and elements thereof having similar functions and we, therefore, do not intend to limit our invention to the specific details of construction shown but prefer rather that we be accorded the full scope of the following claims.

We claim as our invention:

1. In a control linkage adapted to be utilized in conjunction with a variable diameter drive pulley which includes two frusto-conical flanges, one of which is axially shiftable upon a drive shaft in respect to the other, and a variable diameter driven pulley which includes two frusto-conical flanges, one of which is axially shiftable upon a driven shaft in respect to the other, said drive and driven shafts being maintained in substantial parallelism within a common housing and said drive and driven pulleys having a V-belt trained thereupon, the combination of: a first control lever having one end pivotally mounted upon the interior of said housing and its free end contacting the axially shiftable flange of said drive pulley and adapted to control the movement thereof; a second control lever having one end pivotally mounted upon the interior of said housing and its free end contacting the axially shiftable flange of said driven pulley and adapted to control the movement thereof, the pivoted ends of said levers being laterally spaced and lying crosswise of each other adjacent their points of pivotal suspension; connecting means pivotally engaging said levers intermediate the ends thereof; and actuating means pivotally connected to one of said levers adapted to shift said one lever and the other lever laterally and concomitantly through said connecting means.

2. In a control linkage adapted to be utilized in conjunction with a variable diameter drive pulley which includes two frusto-conical flanges, one of which is axially shiftable upon a drive shaft in respect to the other, and a variable diameter driven pulley which includes two frusto-conical flanges, one of which is axially shiftable upon a driven shaft in respect to the other, said drive and driven shafts being maintained in substantial parallelism within a common housing and said drive and driven pulleys having a V-belt trained thereupon, the combination of: a first control lever having one end pivotally mounted upon the interior of said housing and its free end contacting the axially shiftable flange of said drive pulley and adapted to control the movement thereof; a second control lever having one end pivotally mounted upon the interior of said housing and its free end contacting the axially shiftable flange of said driven pulley and adapted to control the movement thereof, the pivoted ends of said control levers lying crosswise of each other; connecting means pivotally engaging said levers intermediate the ends thereof, said connecting means being expansible to simultaneously adjust the free ends of said levers in contact with said shiftable flanges; and actuating means pivotally connected to one of said levers adapted to shift said one lever and the other lever laterally and concomitantly through said connecting means.

3. In a control linkage adapted to be utilized in conjunction with a variable diameter drive pulley which includes two frusto-conical flanges, one of which is axially shiftable upon a drive shaft in respect to the other, and a variable diameter driven pulley which includes two frusto-conical flanges, one of which is axially shiftable upon a driven shaft in respect to the other, said drive and driven shafts being maintained in substantial parallelism within a common housing and said drive and driven pulleys having a V-belt trained thereupon, the combination of: a first control lever having one end pivotally mounted upon the interior of said housing and its free end contacting the axially shiftable flange of said drive pulley and adapted to control the movement thereof; a second control lever having one end pivotally mounted upon the interior of said housing and its free end contacting the axially shiftable flange of said driven pulley annd adapted to control the movement thereof, said levers lying crosswise of each other adjacent their pivoted ends and having their free ends diverging to form a substantial V-shape in side elevation; connecting means pivotally engaging said levers intermediate the ends thereof, said connecting means engaging said levers adjacent their points of pivotal suspension; and actuating means pivotally connected to one of said levers adapted to shift said one lever and the other lever laterally and concomitantly through said connecting means.

4. In a control linkage adapted to be utilized in conjunction with a variable diameter drive pulley which includes two frusto-conical flanges, one of which is axially shiftable upon a drive shaft in respect to the other, and a variable diameter driven pulley which includes two frusto-conical flanges, one of which is axially shiftable upon a driven shaft in respect to the other, said drive and driven shafts being maintained in substantial parallelism within a common housing and said drive and driven pulleys having a V-belt trained thereupon, the combination of: a first control lever having one end pivotally mounted upon the interior of said housing and its free end contacting the axially shiftable flange of said drive pulley and adapted to control the movement thereof; a second control lever having one end pivotally mounted upon the interior of said housing and its free end contacting the axially shiftable flange of said driven pulley and adapted to control the movement thereof, said levers lying crosswise of each other adjacent their pivoted ends and having their free ends diverging to form a substantial V-shape in side elevation; connecting means pivotally engaging said levers intermediate the ends thereof, said connecting means being expansible to simultaneously adjust the free ends of said levers and engaging said levers adjacent their points of pivotal suspension; and actuating means pivotally connected to one of said levers adapted to shift said one lever and the other lever laterally and concomitantly through said connecting means.

5. In a linkage adapted to proportionally and simultaneously adjust within a housing the position of the axially shiftable flange in reference to the fixed flange of a variable diameter drive pulley mounted upon a drive shaft and the position of the axially shiftable flange in reference to the fixed flange of a variable diameter driven pulley mounted upon a driven shaft, the combination of: a first control lever pivotally mounted upon said housing; a second control lever pivotally mounted upon said housing, the free ends of said first and second levers contacting respectively said axially shiftable flanges of said drive and driven pulleys; connecting means pivotally engaging said levers for conjoint movement of the free ends thereof; and actuating means including a rotatable control shaft in driving engagement with a bell crank connected adjacent the lowermost end of one of said levers and adapted to cause said simultaneous and proportional adjustment of said flanges, said bell crank lying in a horizontal plane parallel to the axes of said drive and driven shafts.

6. In a linkage adapted to proportionally and simultaneously adjust within a housing the position of the axially shiftable flange in reference to the fixed flange of a variable diameter drive pulley mounted upon a drive shaft and the position of the axially shiftable flange in reference to the fixed flange of a variable diameter driven pulley mounted upon a driven shaft, the combination of: a first control lever pivotally mounted upon said housing; a second control lever pivotally mounted upon said housing, the free ends of said first and second levers contacting respectively said axially shiftable flanges of said drive and driven pulleys; connecting means pivotally engaging said levers for conjoint movement of the free ends thereof; actuating means including a rotatable control shaft in driving engagement with a bell crank connected to one of said levers adapted to cause said simultaneous and proportional adjustment of said flanges; and indicating means mounted upon said housing connected to said bell crank and adapted to be proportionally displaced in reference to the movement thereof, said indicating means being operable by a pinion which is rotatable by a longitudinally shiftable rack connected to said bell crank.

7. In a linkage adapted to proportionally and simultaneously adjust within a housing the position of the axially shiftable flange in reference to the fixed flange of a variable diameter drive pulley mounted upon a drive shaft and the position of the axially shiftable flange in reference to the fixed flange of a variable diameter driven pulley mounted upon a driven shaft, the combination of: a first control lever pivotally mounted upon said housing; a second control lever pivotally mounted upon said housing, the free ends of said first and second levers contacting respectively said axially shiftable flanges of said drive and driven pulleys, the longitudinal axes of said levers lying across each other adjacent the points of pivotal mounting and the free ends thereof being spaced apart by a distance substantially equivalent to the distance between the axes of said drive and driven shafts; connecting means pivotally engaging said levers for conjoint movement of the free ends thereof; and actuating means including a rotatable control shaft in driving engagement with a bell crank connected to one of said levers adapted to cause said simultaneous and proportional adjustment of said flanges.

8. In a linkage adapted to proportionally and simultaneously adjust within a housing the position of the axially shiftable flange in reference to the fixed flange of a variable diameter drive pulley mounted upon a drive shaft and the position of the axially shiftable flange in reference to the fixed flange of a variable diameter driven pulley mounted upon a driven shaft, the combination of: a first control lever pivotally mounted upon said housing; a second control lever pivotally mounted upon said housing, the free ends of said first and second levers contacting respectively said axially shiftable flanges of said drive and driven pulleys; connecting means pivotally engaging said levers for conjoint movement of the free ends thereof; and actuating means including a bell crank pivotally mounted upon said housing and a threaded control shaft connected to an arm of said bell crank by a travelling nut shiftably carried by said shaft so that the rotation of said shaft and the concomitant movement of said nut will cause the displacement of one of said levers through its pivotal engagement with the other arm of said bell crank, said bell crank lying in a horizontal plane parallel to the axes of said drive and driven shafts and engaging said one lever adjacent its lowermost end.

9. In a control linkage adapted to be utilized in conjunction with a variable diameter drive pulley which includes two frusto-conical flanges, one of which is axially shiftable upon a drive shaft in respect to the other, and a variable diameter driven pulley which includes two frusto-conical flanges, one of which is axially shiftable upon a driven shaft with respect to the other, said drive and driven shafts being maintained in substantial parallelism within a common housing and said drive and driven pulleys having a V-belt trained thereupon, the combination of: a first control lever having one end pivotally mounted on the interior of said housing and its free end contacting the axially shiftable flange of said drive pulley and adapted to control the movement thereof, said first control lever being obliquely positioned with respect to the vertical axis of said housing, the point of pivotal suspension of said first lever being disposed to one side of the axis of said drive shaft and the point of contact of said lever with said flange being disposed on the other side of said drive shaft; a second control lever having one end pivotally mounted upon the interior of said housing and its free end contacting the axially shiftable flange of said driven pulley and adapted to control the movement thereof, said second control lever being obliquely positioned with respect to the vertical axis of said housing, the point of pivotal suspension of said second lever being disposed to one side of the axis of said driven shaft and the point of contact of said lever with said flange being disposed on the other side of said driven shaft; connecting means pivotally engaging said levers intermediate the ends thereof, said connecting means being expansible to simultaneously adjust the free ends of said levers in contact with said shiftable flanges; and actuating means pivotally connected to one of said levers adapted to shift said one lever and the other lever laterally and concomitantly through said connecting means.

10. In a control linkage adapted to be utilized in conjunction with a variable diameter drive pulley which includes two frusto-conical flanges, one of which is axially shiftable upon a drive shaft in respect to the other, and a variable diameter driven pulley which includes two frusto-conical flanges, one of which is axially shiftable upon a driven shaft with respect to the other, said drive and driven shafts being maintained in substantial parallelism within a common housing and said drive and driven pulleys having a V-belt trained thereupon, the combination of: a first control lever having one end pivotally mounted on the interior of said housing and its free end contacting the axially shiftable flange of said drive pulley and adapted to control the movement thereof, said first control lever being obliquely positioned with respect to the vertical axis of said housing; a second control lever having one end pivotally mounted upon the interior of said housing and its free end contacting the axially shiftable flange of said driven pulley and adapted to control the movement thereof, said second control lever being obliquely positioned with respect to the vertical axis of said housing, the pivotal mountings of said levers being disposed at one side of the longitudinal axes of said shafts and the free ends thereof being disposed at the other side of said axes; connecting means pivotally engaging said levers intermediate the ends thereof; and actuating means pivotally connected to one of said levers adapted to shift said one lever and the other lever laterally and concomitantly through said connecting means.

11. In a control linkage adapted to be utilized in conjunction with a variable diameter drive pulley which includes two frusto-conical flanges, one of which is axially shiftable upon a drive shaft in respect to the other, and a variable diameter driven pulley which includes two frusto-conical flanges, one of which is axially shiftable upon a driven shaft in respect to the other, said drive and driven shafts being maintained in substantial parallelism within a common housing and said drive and driven pulleys having a V-belt trained thereupon, the combination of: a first control lever having one end pivotally mounted upon the interior of said housing and its free end contacting the axially shiftable flange of said drive pulley and adapted to control the movement thereof, said first control lever being obliquely positioned with respect to the vertical axis of said housing; a second control lever having one end pivotally mounted upon the interior of said housing and its free end contacting the axially shiftable flange of said driven pulley and adapted to control the movement thereof, said second control lever being obliquely positioned with respect to the vertical axis of said housing, the axes of said first and second control levers lying across each other adjacent the pivoted ends thereof; connecting means pivotally engaging said first and second control levers intermediate the ends thereof; and actuating means pivotally connected to one of said levers adapted to shift said one lever and the other lever laterally and concomitantly through said connecting means.

CARL E. JOHNSON.
EARL MENDENHALL.

REFERENCES CITED

The following references are of record in the file of this patent:

UNITED STATES PATENTS

| Number | Name | Date |
|---|---|---|
| 562,234 | McIntyre | June 16, 1896 |
| 1,336,542 | Sollima | Apr. 13, 1920 |
| 1,375,053 | Lewellyn | Apr. 19, 1921 |
| 1,546,996 | Reeves | July 21, 1925 |
| 2,109,247 | Clay | Feb. 22, 1938 |
| 2,347,479 | Higgins | Apr. 25, 1944 |
| 2,398,235 | Luenberger | Apr. 9, 1946 |
| 2,532,762 | Deletaille | Dec. 5, 1950 |
| 2,533,197 | Pinkvoss | Dec. 5, 1950 |

FOREIGN PATENTS

| Number | Country | Date |
|---|---|---|
| 239,593 | Switzerland | Feb. 18, 1946 |
| 368,050 | Great Britain | Mar. 3, 1932 |
| 394,905 | Germany | Nov. 30, 1922 |